United States Patent
Shioi et al.

(10) Patent No.: US 6,192,856 B1
(45) Date of Patent: Feb. 27, 2001

(54) ELECTRONIC FUEL INJECTION APPARATUS

(75) Inventors: Kenzo Shioi; Keiichi Iida; Tomoo Nishikawa, all of Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/576,538

(22) Filed: May 23, 2000

(30) Foreign Application Priority Data

May 31, 1999 (JP) .................................................. 11-152589

(51) Int. Cl.[7] .......................................................... F02B 3/00
(52) U.S. Cl. ............................................. 123/300; 123/506
(58) Field of Search ..................................... 123/449, 479, 123/198 D, 506, 500, 501, 458, 299, 300

(56) References Cited

U.S. PATENT DOCUMENTS

| 4,782,803 | * | 11/1988 | Kikuchi ................... 123/300 |
| 4,788,960 | * | 12/1988 | Oshizawa ................ 123/506 |
| 4,817,575 | * | 4/1989 | Hofer ....................... 123/506 |
| 4,831,986 | * | 5/1989 | Linder et al. ............ 123/449 |
| 5,044,903 | * | 9/1991 | Rembold .................. 417/500 |
| 5,273,017 | * | 12/1993 | Braun et al. ............. 123/506 |
| 5,325,837 | * | 7/1994 | Laufer .................... 123/506 |
| 5,343,845 | * | 9/1994 | Fehlmann ................ 123/506 |
| 5,697,338 | * | 12/1997 | Hirose et al. ........... 123/357 |

FOREIGN PATENT DOCUMENTS

| 2-33865 | 7/1990 | (JP) . |
| 10-302242 | 10/1998 | (JP) . |

* cited by examiner

Primary Examiner—Carl S. Miller
(74) Attorney, Agent, or Firm—Staas & Halsey LLP

(57) ABSTRACT

In an electronic fuel injection apparatus comprising a control circuit of an electromagnetic spill valve for adjusting a fuel injection quantity in a distribution-type fuel injection pump for a diesel engine, and a computing unit for providing a command signal to the control circuit, a driving current flowing through a solenoid of an electromagnetic spill valve is detected, a state where a delay time interval from a transit point of a command signal provided to the control circuit to a delay point at which the driving current crosses a threshold value is equal to or more than a predetermined value is determined as a slightly abnormal state to invalidate the command signal for a pilot injection, or a state where the delay time interval exceeds an allowable value further larger than the predetermined value is determined as a seriously abnormal state to stop the engine.

8 Claims, 5 Drawing Sheets

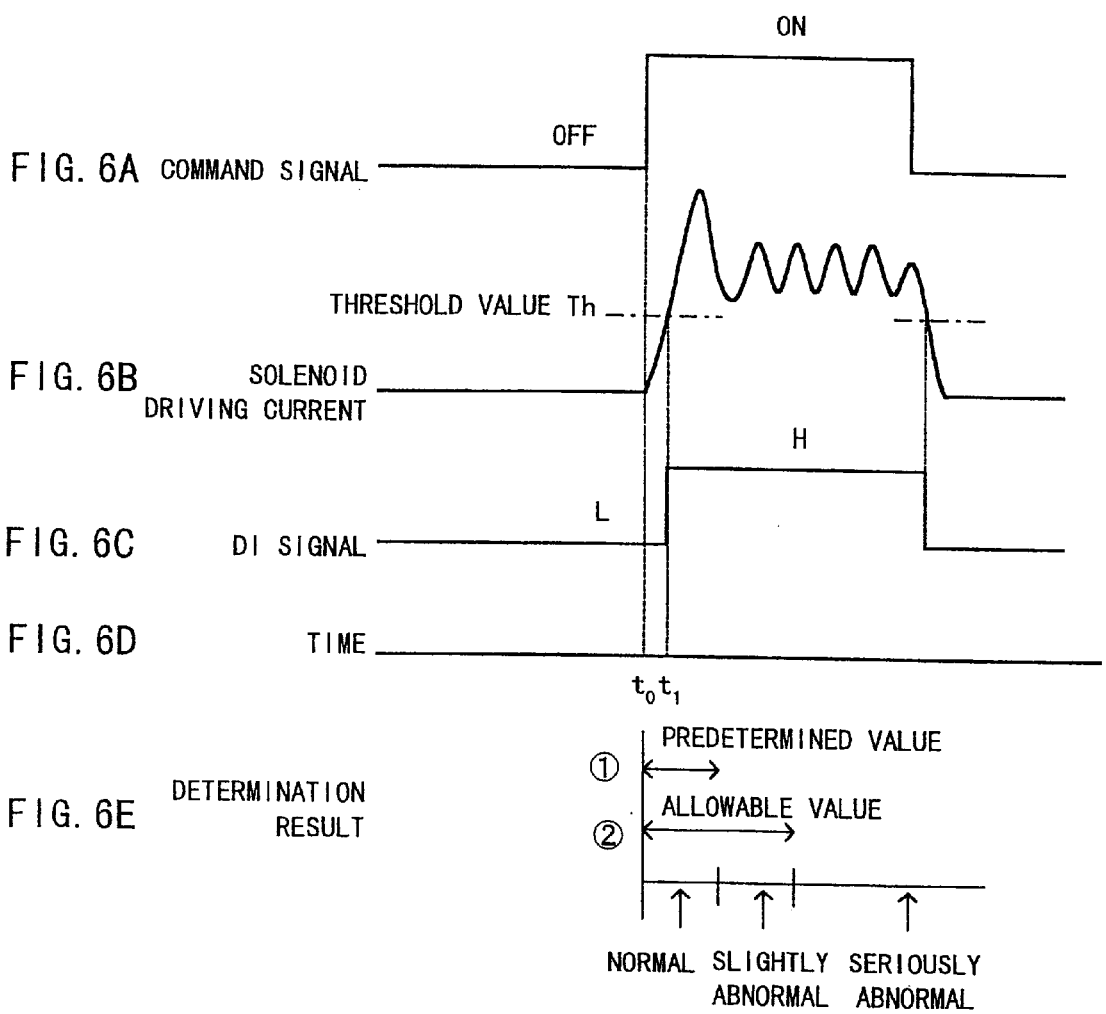

ELECTRONIC FUEL INJECTION APPARATUS

BACKGROUND OF THE INVENTION

1. Field of the Invention

The present invention relates to an electronic fuel injection apparatus, and in particular to an electronic fuel injection apparatus which controls a distribution (VE)-type fuel injection pump for a diesel engine.

2. Description of the Related Art

A control circuit of an electromagnetic spill valve (SPV) of a distribution-type fuel injection pump provided for adjusting a fuel injection quantity of a diesel engine in a conventional electronic fuel injection apparatus increases the fuel injection quantity to abnormally raise an engine revolution (RPM), resulting in a dangerous state when a fault occurs in the electromagnetic spill valve and the control circuit thereof.

On the other hand, when the solenoid driving current of the electromagnetic spill valve supplied by the control circuit presents an abnormal state as in the Japanese Patent Publication Laid-open No.7-269404, the abnormal state is detected by monitoring the voltage of a current supplying capacitor. When the abnormal state is detected, the solenoid energizing time interval of the electromagnetic spill valve is elongated to advance the energizing time, thereby avoiding an engine stop state which may occur when a peak current cannot be supplied.

Although the Japanese Patent Publication Laid-open No.7-269404 and such can avoid the engine stop state caused by the faults of the control circuit of the electromagnetic spill valve, there has been a problem that the situation where a fault occurs in the electromagnetic spill valve per se to cause an abnormal revolution can not be avoided.

SUMMARY OF THE INVENTION

It is accordingly an object of the present invention to provide an electronic fuel injection apparatus comprising a control circuit of an electromagnetic spill valve for adjusting a fuel injection quantity in a distribution-type fuel injection pump for a diesel engine, and a computing unit for providing a command signal to the control circuit, in which a dangerous state is prevented beforehand when faults occur not only in the control circuit of the electromagnetic spill valve but also in the electromagnetic spill valve per se.

In order to achieve the above-mentioned object, an electronic fuel injection apparatus according to the present invention comprises a control circuit having, on either an inside or outside of the control circuit of an electromagnetic spill valve, means for detecting a driving current which flows through a solenoid of the spill valve, and means for detecting a delay point at which the driving current detected crosses a threshold value, and a computing unit having means for determining a state where a delay time interval from a transit point of the command signal to the delay point is equal to or more than a predetermined value as a slightly abnormal state to invalidate the command signal for a pilot injection.

Namely, in the present invention, the driving current which flows through the solenoid of the electromagnetic spill valve is detected, and the point (delay point) at which the driving current crosses (becomes equal to or more than, or equal to or less than) the threshold value is further detected. This may be executed on either the inside or outside of the control circuit.

The computing unit determines whether or not the delay time interval from the transit point (switchover point of ON/OFF) of the command signal to the delay point is equal to or more than a predetermined time.

As a result, recognizing that the delay time interval is equal to or more than the predetermined time, the computing unit determines the state as a slightly abnormal state to invalidate the command signal for the pilot injection.

Thus, when the electromagnetic spill valve per se or the control circuit thereof is in the slightly abnormal state, only the pilot injection which may be performed in advance of a main injection depending on the driving state of the engine is invalidated, so that what requires an instantaneous response is preliminarily avoided, whereby the fuel injection is more safely performed even when the electromagnetic spill valve is in such a slightly abnormal state.

It is to be noted that the means for detecting the delay point may be provided in the computing unit on the outside of the control circuit.

Furthermore, when it is determined that the above-mentioned delay time interval exceeds an allowable value larger than the above-mentioned predetermined value, the state is determined as a seriously abnormal state to stop the engine at present.

Thus, a very dangerous state, i.e. an abnormal raise of the engine revolution can be avoided beforehand.

It is preferable that when such an abnormal state is detected, a warning is given by using warning means.

BRIEF DESCRIPTION OF THE DRAWINGS

FIGS. 6A–6E are waveform diagrams for explaining a DI signal generated at a control circuit of an electronic fuel injection apparatus according to the present invention.

Throughout the figures, like reference numerals indicate like or corresponding components.

DESCRIPTION OF THE EMBODIMENTS

Figure 1:
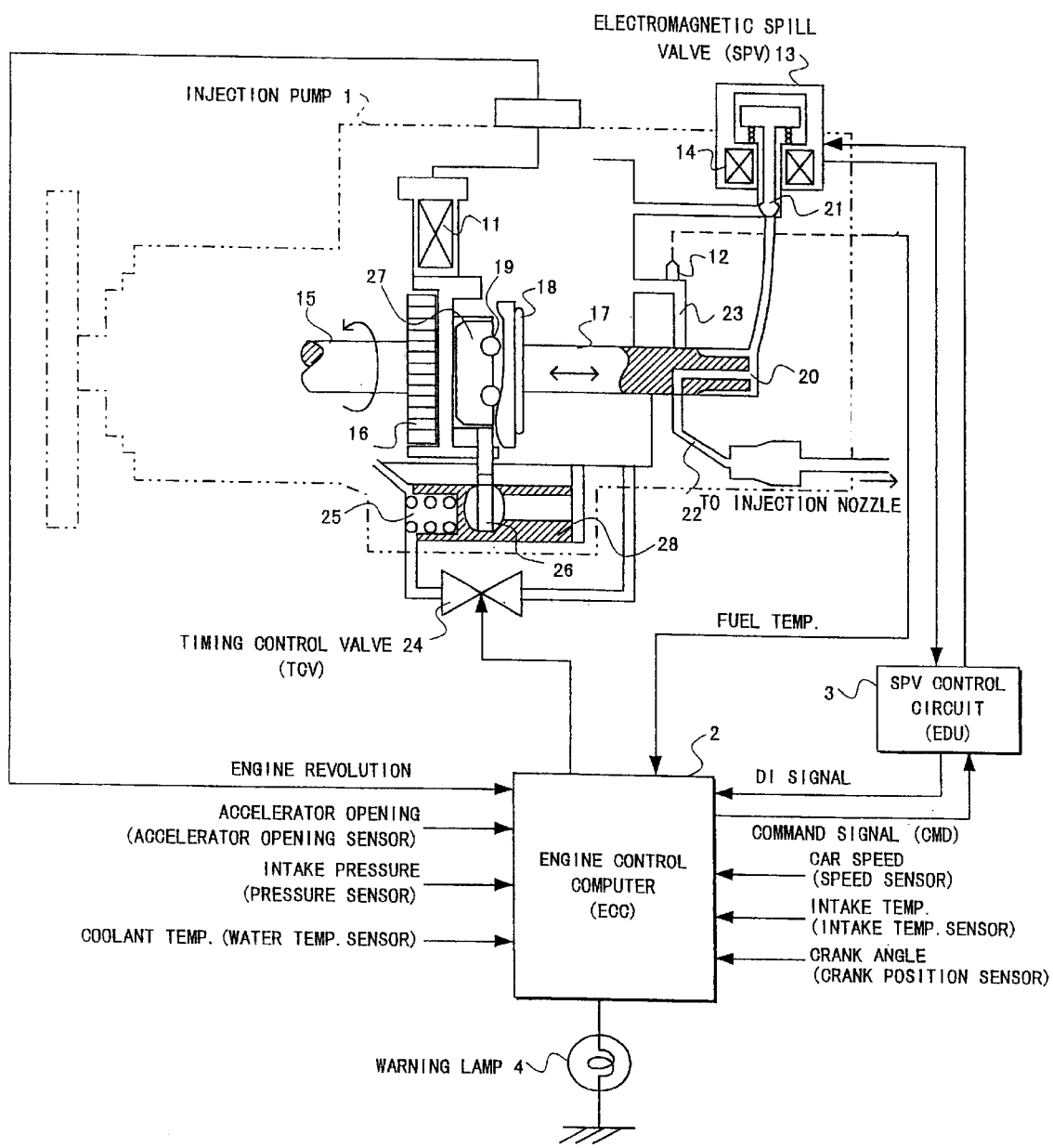
FIG. 1 is an arrangement diagram showing an embodiment of an electronic fuel injection apparatus according to the present invention.

FIG. 1 shows an embodiment of an electronic fuel injection apparatus according to the present invention, which is schematically composed of an injection pump 1, an engine control computer (hereinafter abbreviated as ECC) 2, and an electromagnetic spill valve control circuit (EDU) 3.

The ECC 2 inputs an engine revolution signal from a revolution sensor 11 provided in the injection pump 1, a fuel temperature signal from a fuel temperature sensor 12, an accelerator opening signal, an intake pressure signal, a coolant temperature signal, a car speed signal, an intake temperature signal, and a crank angle signal respectively outputted from an accelerator opening sensor, a pressure sensor, a water temperature sensor, a speed sensor, an intake temperature sensor, and a crank position sensor (none of which are shown). Then, the ECC 2 performs a predetermined computation for providing a command signal CMD to the control circuit 3 of the electromagnetic spill valve and for providing a control signal to a timing control valve (hereinafter abbreviated as TCV) 24.

In addition, receiving such a command signal CMD, the control circuit 3 sends a driving signal to a solenoid 14 in an electromagnetic spill valve 13 provided in the injection pump 1.

Hereinafter, the operation of the injection pump 1, which is well known though, in such an electronic fuel injection apparatus will be briefly described.

When a drive shaft 15 rotates which is made to rotate in synchronization with the crank shaft (not shown) of the engine, a pulsar 16 rotates, so that the engine revolution is provided from the sensor 11 which detects the rotating state to the ECC 2.

A plunger 17 rotates as the drive shaft 15 rotates. When a cam plate 18 united with the plunger 17 simultaneously rotates, a cam provided in the cam plate 18 rides on an opposite and fixed roller ring 19 whereby the plunger 17 reciprocates as shown by the arrow of FIG. 1.

When the plunger 17 shifts to the right direction in FIG. 1, a fuel in a pressure chamber 20 is compressed. At this time, if the solenoid 14 of the electromagnetic spill valve 13 is made ON and an on-off valve 21 which also serves as an armature is controlled to be in the closed state as shown in FIG. 1, the fuel of the pressure chamber 20 is to be compressedly forwarded from a distribution port 22 to an injection nozzle (not shown).

In addition, since the on-off valve 21 is opened when the plunger 17 shifts to the left direction in FIG. 1 and the solenoid 14 is made OFF, the fuel of the pressure chamber 20 is pushed back to the pump chamber, so that compressedly forwarding the fuel is finished, and the fuel is again sucked from an intake port 23 to the pressure chamber 20.

Thus, controlling the OFF timing of the electromagnetic spill valve 13 determines the fuel injection quantity of the injection pump 1.

On the other hand, for a control mechanism of a fuel injection time, are provided the roller ring 19 which modifies the reciprocation timing of the plunger 17 by being rotated around the plunger 17, a timer piston 28 which is connected to a roller holder 27 through a pin 26 and moves depending on an oil pressure, and the TCV 24 which adjusts the oil pressure applied to the timer piston 28.

The ECC 2 determines the position of the timer piston 28 by controlling the duty ratio of the TCV 24. The pin 26 is moved through a pressure chamber 25 where the fuel is also enclosed, thereby making the roller ring 19 rotate and the lift starting point of the cam plate 18 control. Thus, the injection starting time is controlled.

Figure 2:
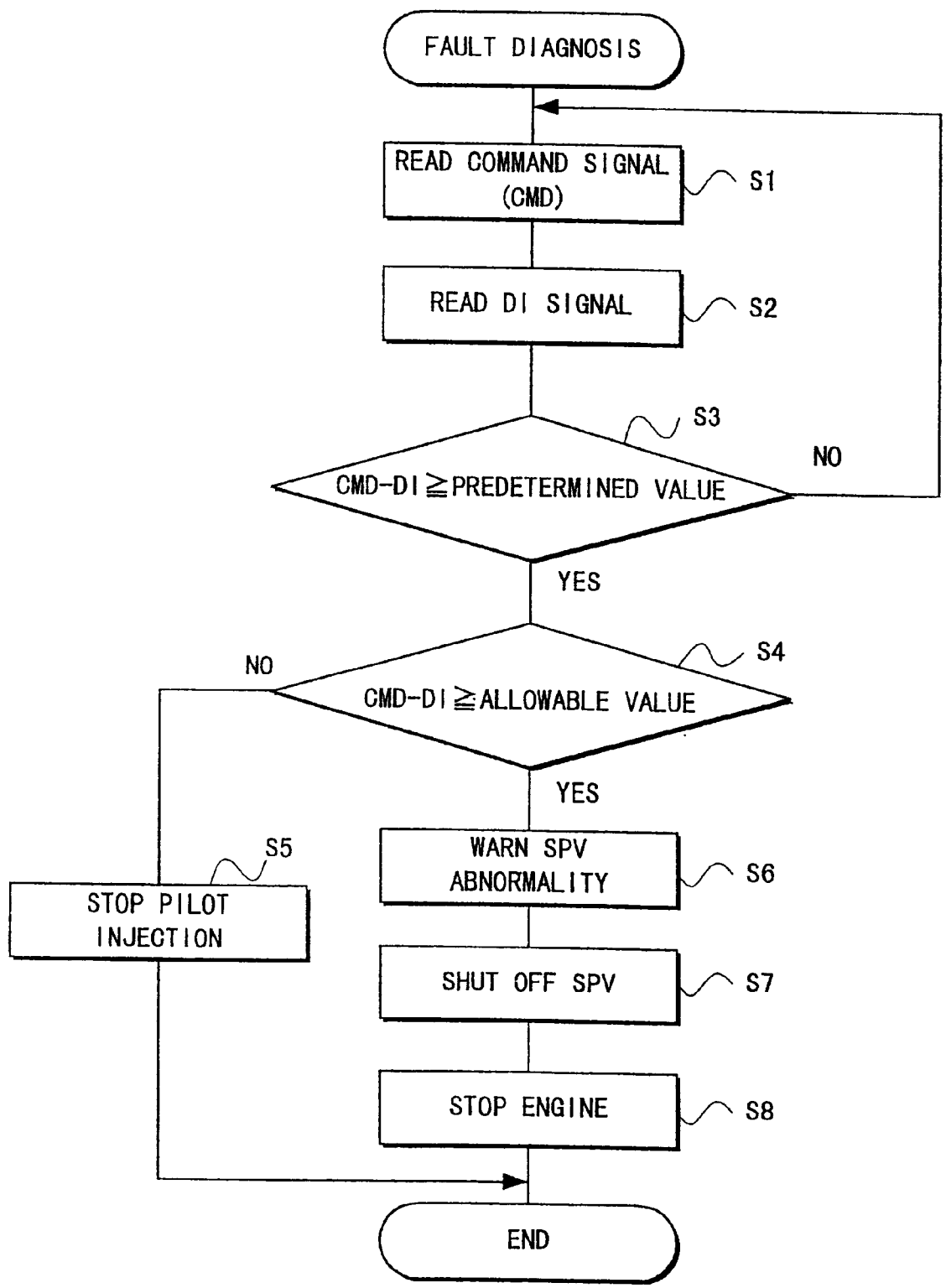
FIG. 2 is a flow chart showing a control operation in an engine control computer (ECC) shown in FIG. 1.

The operation of such an embodiment will be described by referring to the flow chart shown in FIG. 2 and the time chart of the command signal and a DI signal shown in FIGS. 3 and 4.

Figure 3:
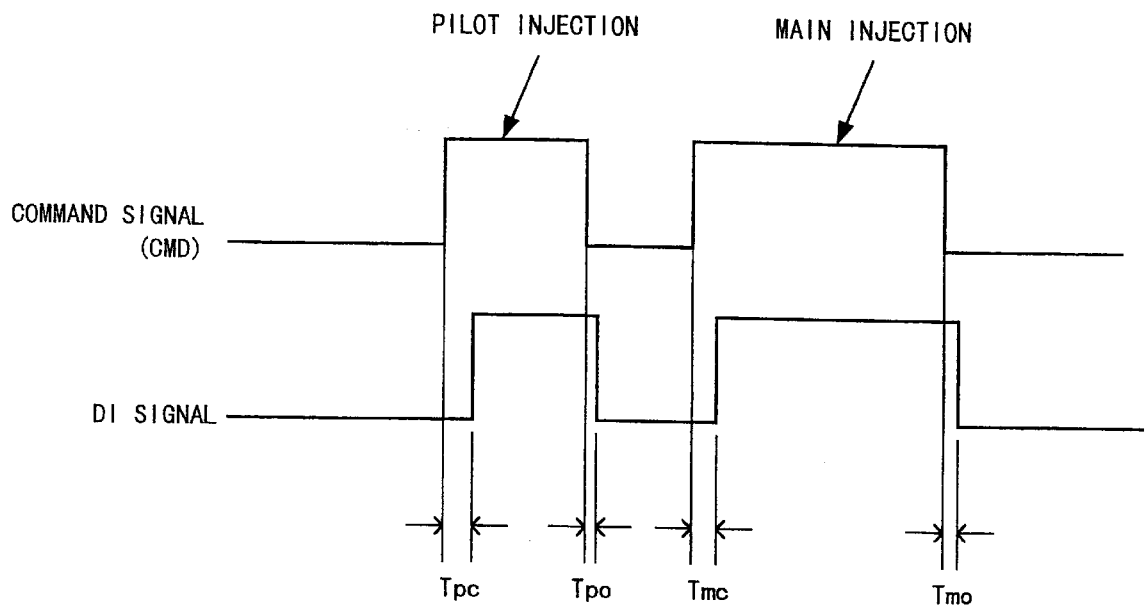
FIG. 3 is a diagram showing a time chart (when a pilot injection is executed) of a command signal (CMD) and a DI signal used for an electronic fuel injection apparatus according to the present invention.
Figure 4:
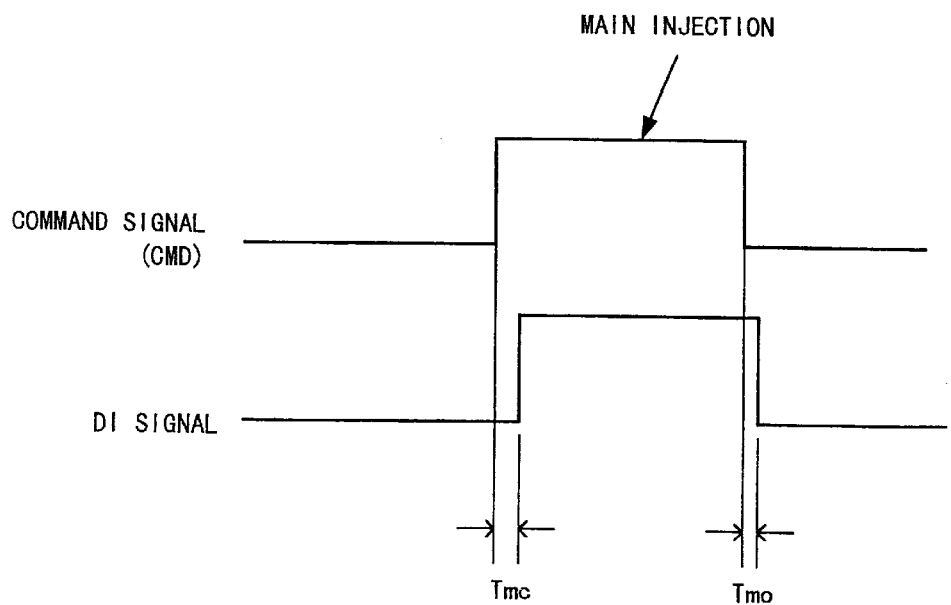
FIG. 4 is a diagram showing a time chart (when a pilot injection is not executed) of a command signal (CMD) and a DI signal used for an electronic fuel injection apparatus according to the present invention.

It is to be noted that FIG. 3 shows the case where the pilot injection is executed depending on a driving state of an engine when an instantaneous fuel injection response is required, while FIG. 4 shows the case where not the pilot injection but the main injection is only executed depending on the driving state of the engine.

Firstly, the ECC 2 generates the command signal CMD which is provided to the control circuit 3 and writes the signal in a memory (not shown) (at step S1, in FIG. 2), and further reads the DI signal as a feedback (response) signal indicating a solenoid driving result from the control circuit 3 (at step S2).

The ECC 2 computes the interval of CMD-DI and determines whether or not this interval is larger than a predetermined value (at step S3). Namely, a delay time interval Tpc from the time when the command signal CMD rises to the time when the DI signal rises in the pilot injection shown in FIG. 3 is obtained to be compared with a predetermined value (e.g. 500 $\mu$sec).

It is to be noted that such a determination at step S3 may be performed by obtaining a delay time interval Tpo, in addition to the above-mentioned delay time interval Tpc, from the time when the command signal CMD falls to the time when the corresponding DI signal falls in the pilot injection as shown in FIG. 3, to be compared with a predetermined value (in this case e.g. 200 $\mu$sec).

Furthermore, such a determination may be performed by obtaining similar delay time intervals Tmc and Tmo in the main injection following the pilot injection, to be compared with a predetermined value (in this case e.g. 450 $\mu$sec or 250 $\mu$sec).

After this process, the ECC 2 further compares the above-mentioned interval of CMD-DI with an allowable value (at step S4). The allowable value in this case indicates a dangerous value larger than the above-mentioned predetermined value, so that e.g. "1 ms" can be used for any of the above-mentioned predetermined values.

When it is found that the interval of CMD-DI does not exceed the allowable value at step S4, the ECC 2 determines the state of the electromagnetic spill valve 13 as a slightly abnormal state to stop only the pilot injection as shown in FIG. 3 (at step S5). Of course, when the pilot injection is not executed as shown in FIG. 4, it is needless to execute step S5.

Thus, since the electromagnetic spill valve 13 is in a state where something abnormal is recognized, the pilot injection which requires an instantaneous response is invalidated, thereby safely avoiding a malfunction or the like caused by the pilot injection.

On the other hand, when it is found that the interval CMD-DI is equal to or more than the allowable value at step S4, it is indicated that any one of the above-mentioned delay time intervals Tpc, Tpo, Tmc, and Tmo is more than the allowable value and the electromagnetic spill valve 13 is in a seriously abnormal state. Therefore, the ECC 2 turns on a warning lamp 4 to warn the abnormality of the electromagnetic spill valve 13 (at step S6). It is to be noted that the warning by using the warning lamp 4 may be performed when the pilot injection is stopped (not shown) (at step S5).

Together with the warning, the ECC 2 refrains from sending the command signal CMD for the control circuit 3 whereby the control circuit 3 makes the solenoid 14 OFF to open the on-off valve 21, so that the electromagnetic spill valve 13 is shut off (at step S7). This prevents the fuel from being sent to the injection nozzle, which assumes the engine stop state (at step S8).

Thus, when the electromagnetic spill valve 13 is in a very dangerous state, the engine is stopped so that the abnormality of the engine revolution can be prevented.

Hereinafter, the arrangement and operation of the control circuit 3 of the electromagnetic spill valve 13 will be described by referring to FIGS. 5 and 6.

This control circuit 3 has a high voltage generation circuit 31, instantaneously flows a large current at the time of exciting the electromagnetic solenoid 14, and makes the on-off valve 21 open in a short time.

Namely, if the command signal CMD (see FIG. 6A) is provided from the ECC 2 (at time $t_0$ in FIG. 6D), FET's 32 and 33 are made ON and a high voltage from the high voltage generation circuit 31 is applied to the solenoid 14. Thus, an instantaneous high current as shown in FIG. 6B flows through a current detector 34. It is to be noted that the current detector 34 may be provided on the outside of the control circuit 3 instead of the inside thereof, as shown in FIG. 5.

After a sufficient time elapses for opening the on-off valve 21 in the electromagnetic spill valve 13, the operation now shifts to a chopping control using a low voltage power supply 35. The FET 36 is intermittently made ON by the low voltage power supply 32 with the FET 32 being made OFF so that a low voltage is applied to the solenoid 14 like a pulse, thereby reducing the electric power.

When the command signal CMD changes from ON to OFF, the FET 36 is made OFF, and the FET 33 is also made OFF.

Thus, when the applied voltage to the solenoid 14 is cut in a moment, a counter electromotive force occurs in the solenoid 14 to flow the inverse current, so that the solenoid 14 generates an electromagnetic force to prevent itself from being made OFF.

Therefore, the counter electromotive force is dropped in a moment to the ground potential by using the FET 33 or an avalanche breakdown of a Zener diode 37, so that the inverse current and the electromagnetic force are lost in a moment.

Thus, the solenoid driving current flowing through the current detector 34 in the control circuit 3 is compared with a threshold value Th, so that the DI signal (see FIG. 6C) as a logical signal is outputted to be provided to the ECC 2.

Figure 5:
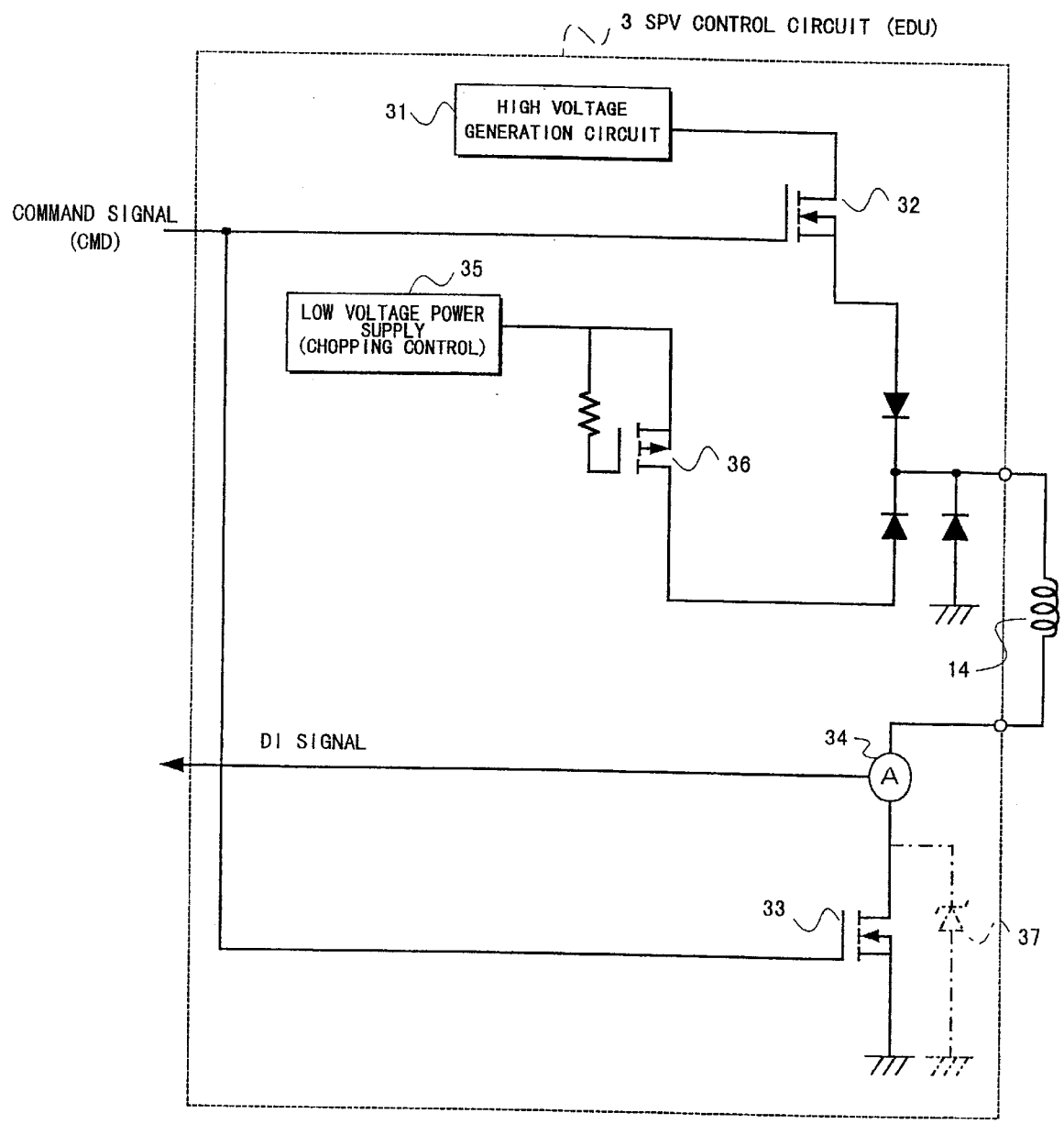
FIG. 5 is a circuit diagram showing an embodiment of a control circuit of an electromagnetic spill valve used for an electronic fuel injection apparatus according to the present invention.

It is to be noted that the DI signal can be easily obtained by the comparison with the threshold value Th at a comparator (not shown in FIG. 5). In addition, such a comparator can be provided on the outside of the current detector 34 or the control circuit 3.

Furthermore, the DI signal as shown in FIG. 6C may be generated by directly providing the solenoid driving current detecting signal in FIG. 6B from the current detector 34 to the ECC 2, and by the comparison with the threshold value Th held inside the ECC2 after the conversion from an analog signal into a digital signal at the ECC 2.

Thus, the time interval from the time $t_0$ to the time $t_1$ shown in FIG. 6D is equivalent to the delay time interval Tpc, Tpo, Tmc, or Tmo in FIGS. 3 and 4.

As described above, an electronic fuel injection apparatus according to the present invention is arranged such that a driving current flowing through a solenoid of an electromagnetic spill valve is detected, and a state where a delay time interval from a transit point of a command signal provided to a control circuit to a delay point at which the driving current crosses a threshold value is equal to or more than a predetermined value is determined as a slightly abnormal state to invalidate the command signal for a pilot injection, or a state where the delay time interval exceeds an allowable value further larger than the predetermined value is determined as a seriously abnormal state to stop the engine. Therefore, it becomes possible to prevent an abnormal increase of an engine revolution even when a fault occurs in the electromagnetic spill valve per se.

What we claim is:

1. An electronic fuel injection apparatus comprising;
    a control circuit of an electromagnetic spill valve for adjusting a fuel injection quantity in a distribution-type fuel injection pump for a diesel engine, and
    a computing unit for providing a command signal to the control circuit,
        the control circuit having, on either an inside or outside of the control circuit, means for detecting a driving current which flows through a solenoid of the spill valve, and means for detecting a delay point at which the driving current detected crosses a threshold value, and
        the computing unit having means for determining a state where a delay time interval from a transit point of the command signal to the delay point is equal to or more than a predetermined value as a slightly abnormal state to invalidate the command signal for a pilot injection.

2. The electronic fuel injection apparatus as claimed in claim 1 wherein the means for detecting the delay point is provided in the computing unit on the outside of the control circuit.

3. The electronic fuel injection apparatus as claimed in claim 1 wherein the computing unit further includes means for determining a state where the delay time interval exceeds an allowable value larger than the predetermined value as a seriously abnormal state to stop the engine.

4. The electronic fuel injection apparatus as claimed in claim 2 wherein the computing unit further includes means for determining a state where the delay time interval exceeds an allowable value larger than the predetermined value as a seriously abnormal state to stop the engine.

5. The electronic fuel injection apparatus as claimed in claim 1, further including means for warning the abnormal state.

6. The electronic fuel injection apparatus as claimed in claim 2, further including means for warning the abnormal state.

7. The electronic fuel injection apparatus as claimed in claim 3, further including means for warning the abnormal state.

8. The electronic fuel injection apparatus as claimed in claim 4, further including means for warning the abnormal state.

* * * * *